(12) United States Patent
Stanley

(10) Patent No.: US 7,357,160 B2
(45) Date of Patent: Apr. 15, 2008

(54) FUEL DISPENSER BASE SPACER

(75) Inventor: Dean P. Stanley, Fort Wayne, IN (US)

(73) Assignee: Tokheim Holding, B.V., Ad Bladel (NL)

( * ) Notice: Subject to any disclaimer, the term of this patent is extended or adjusted under 35 U.S.C. 154(b) by 0 days.

(21) Appl. No.: 10/435,986

(22) Filed: May 12, 2003

(65) Prior Publication Data

US 2004/0050447 A1 Mar. 18, 2004

Related U.S. Application Data

(60) Provisional application No. 60/379,943, filed on May 13, 2002.

(51) Int. Cl.
*B65B 1/04* (2006.01)
(52) U.S. Cl. ............ 141/98; 248/311.2; 52/126.6
(58) Field of Classification Search ............ 141/1, 141/98, 311 A; 137/234.6, 376; 222/383.1; 52/126.6; 211/175, 207; 248/311.2; 187/240–244; 414/426, 490, 495; 405/20, 52
See application file for complete search history.

(56) References Cited

U.S. PATENT DOCUMENTS

| | | | |
|---|---|---|---|
| 2,366,529 A * | 1/1945 | Hoff ............... | 141/106 |
| 2,544,822 A | 3/1951 | Brown | |
| 2,545,949 A | 3/1951 | Fox | |
| 2,846,078 A * | 8/1958 | Shelby ............ | 211/85 |
| 4,009,918 A | 3/1977 | MacDonald et al. | |
| 4,034,878 A * | 7/1977 | Fox ............... | 214/374 |
| 4,515,398 A | 5/1985 | Machon, Sr. | |
| 4,554,689 A | 11/1985 | Segler | |
| 5,257,652 A * | 11/1993 | Lawrence ......... | 141/86 |
| 5,303,430 A | 4/1994 | Fernie et al. | |
| 5,605,207 A * | 2/1997 | Betcher et al. ... | 187/244 |
| 5,800,143 A * | 9/1998 | Bravo ............. | 405/52 |
| 5,845,439 A | 12/1998 | Hendley | |
| 5,867,403 A | 2/1999 | Sasnett, Jr. et al. | |
| 5,907,933 A | 6/1999 | Stanfill | |
| 5,954,085 A * | 9/1999 | Moore et al. ..... | 137/234.6 |

\* cited by examiner

*Primary Examiner*—Timothy L. Maust
(74) *Attorney, Agent, or Firm*—Baker & Daniels LLP

(57) ABSTRACT

An apparatus for adjusting the height of a fuel dispenser includes a support or base assembly coupled to the fuel dispenser at its underside. The apparatus is mounted to a service station island or refueling position roadway. One form of the apparatus includes at least one base member. Several base members can be connected together in a stacking formation to form a composite bed for the fuel dispenser having a desired vertical rise. Fasteners are used to interconnect the base members and to make a connection to the fuel dispenser. Another form of the apparatus includes upper and lower members disposed in adjustable vertically slidable relationship to one another. The fuel dispenser rests on the upper member. The height of the fuel dispenser can be adjusted by moving the upper member relative to the lower member.

34 Claims, 1 Drawing Sheet

FUEL DISPENSER BASE SPACER

CROSS-REFERENCE TO RELATED APPLICATIONS

This application hereby claims the benefit under Title 35, United States Codes § 119(e) of any U.S. application ser. No. 60/379,943 filed May 13, 2002, and is hereby incorporated by reference.

BACKGROUND OF THE INVENTION

1. Field of the Invention

The present invention relates to a spacer that attaches to a fuel dispenser to adjust the height of the fuel dispenser.

2. Description of the Related Art

Fuel dispensers are typically located on elevated service station islands. The island is approximately six inches in height on average and rises from the roadway surface where a refueling vehicle is stationed. The island essentially serves as an elevated platform area for housing the fuel dispenser.

One of the reasons the island is approximately six inches in height is because that dimension is considered the best ergonomic height for the refueling customer in terms of accessibility and ease of interaction with the dispenser equipment, e.g., fuel nozzle assembly and payment module. Another reason governing the vertical rise of the fuel station island is to ensure compliance with the American Disabilities Act (ADA), which requires the lowest button or functional key on the fuel dispenser to be a particular height.

However, one problem is that some service stations have islands that are shorter than six inches in height. Also, some service stations do not use islands and place their fuel dispensers on the ground. A service station that uses either an island that is less than six inches in height or no island at all, causes discomfort for the customer using the fuel dispenser, as well as, possibly being out of compliance with the ADA standards. Additionally, the consequence of constructing a service station island with insufficient vertical rise is that it affects the accessibility of the fuel dispenser equipment disposed on the island.

A need therefore exists to address problems relating to the construction of fuel dispenser positions, namely, inadequate geometries pertaining to the vertical dimension of service station islands.

SUMMARY OF THE INVENTION

The present invention, in one form thereof, comprises an apparatus for increasing the height of a fuel dispenser. The apparatus includes at least one member. A connecting means is used for connecting one of the members to the fuel dispenser.

The present invention, in another form thereof, comprises a kit for increasing the height of a fuel dispenser. The kit includes at least two members. Also, the kit includes a connecting means for connecting each one of the members to adjacent members as well as connecting one of the members to the fuel dispenser.

The present invention, in yet another form thereof, comprises a method of increasing the height of a fuel dispenser. A member is connected to the fuel dispenser to increase the height of the fuel dispenser.

The present invention, in still another form thereof, comprises an adjustable apparatus for increasing the height of a fuel dispenser. The apparatus includes an adjustable member. Also, the apparatus includes an adjustment means for adjusting the height of the adjustable member.

One advantage of the present invention is the ability to increase the height of the fuel dispenser if there is no service station island or if the service station island is too short. The ADA requires the lowest button on the fuel dispenser to be a particular height. If there is no service station island or the island is too short, the present invention will increase the height of the fuel dispenser to comply with the ADA standard.

Another advantage of the present invention is if there is no service station island or the island is too short, the present invention increases the height of the dispenser to be at an ideal, optimal or desired ergonomic height for the customer.

Another advantage is that the invention can be used in conjunction with any fuel dispenser environment and therefore is not limited by the construction specifications of fuel dispenser positions.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
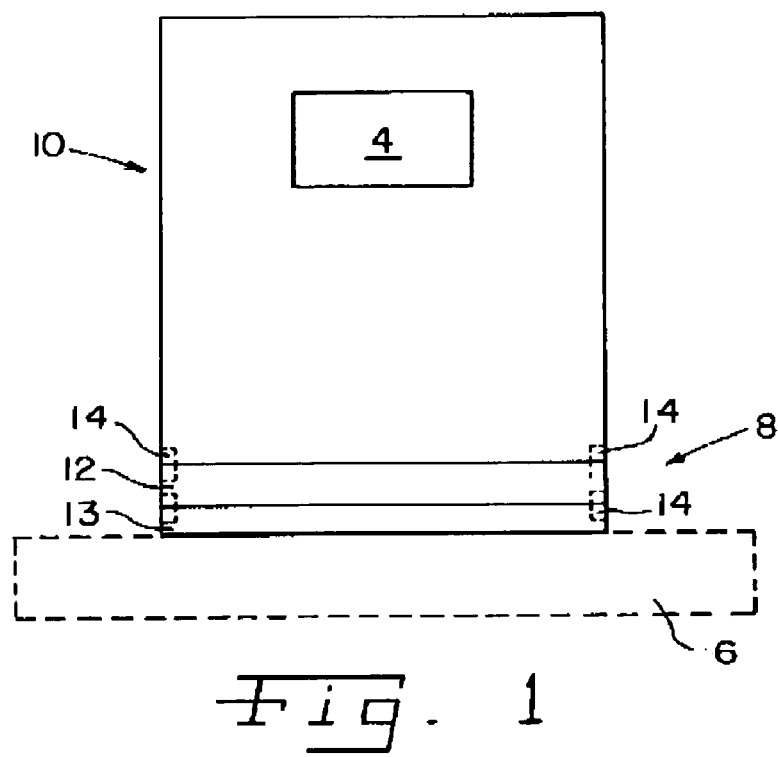
FIG. 1 is a diagrammatic view of an apparatus to increase the vertical rise of a fuel dispenser, according to one form of the invention.

Referring to FIG. 1, there is shown an apparatus (generally illustrated at 8) for increasing the height of a fuel dispenser 10, according to one form of the invention. Generally, the apparatus 8 employs at least one support platform, base or bed-type member that rests on the upper surface of the island and upon which the fuel dispenser housing structure is mounted. In this manner, the height of the fuel dispenser 10 is adjusted by the cumulative vertical extent of each platform member in use. In one form, plural such platform members are arranged in a stacked configuration. Accordingly, the vertical rise of the fuel dispenser can be adjusted by varying the number of such platform members that are stacked together.

The individual platform members can be provided in any suitable geometry, specifically, a selective vertical dimension or thickness. A designer, then, can essentially build a customized platform having a specific vertical height by selecting the appropriate combination of platform members that realize a composite or cumulative vertical distance corresponding to the desired measurement.

The illustrated apparatus 8 includes at least one member 12. In one form, apparatus 8 can be provided in a multi-level configuration having a series of individual discrete members 12 in stacked relationship to one another. For example, in FIG. 1, there is shown a construction for apparatus 8 including first member 12 disposed on second member 13. However, this arrangement should not be considered in limitation of the invention, as any number of such exemplary members 12 can be combined in stacking relationship to one another.

As shown, first member 12 defines an upper end portion or top side of apparatus 8 for direct mounting of fuel dispenser 10 thereon. Second member 13 defines a lower end portion or bottom side of apparatus 8 for direct mounting to service station island 6. The vertical reach of fuel dispenser 10 is increased by the cumulative vertical thicknesses of members 12 and 13. Generally, the vertical height of fuel dispenser 10 is increased by the total vertical dimension of apparatus 8, namely, the sum of the vertical dimensions of each individual member 12 in the stacked arrangement.

The individual elements of apparatus 8 exemplified by members 12, 13 can have variable heights and typically will be in the range of one to eight inches, although other heights can be used as well. The shape of member 12 is rectangular but the shape is not limited to being rectangular. In one form, the construction and shape of member 12 will be governed (at least in part) by the ability of member 12 to adequately support fuel dispenser 10. The width of each side of member 12 is in the range of, but is not limited to, four to twelve inches. Member 12 can be constructed as one solid piece or multiple pieces connected together using fasteners or welding the multiple pieces together to form the desired shape.

Any number of individual members 12 can be connected to one another in any suitable combination to vary the height of the fuel dispenser. For example, if the fuel dispenser needed to be elevated by four inches, the person performing the installation could use one 4" spacer (i.e., member 12), two 2" spacers or possibly four 1" spacers. Other combinations of members can be used as well.

As shown, first member 12 is connected or otherwise coupled to fuel dispenser 10 using a connecting means 14. Connecting means 14 can be a fastener or any other type of device suitable to connect member 12 to fuel dispenser 10. Also, if more than one member is used (as illustrated in FIG. 1), the stacked members 12, 13 will be similarly connected to one another using a connecting means 14.

In one exemplary form of connecting means 14, the members 12, 13 could be provided with a complementary mating tongue-and-groove set that interfit with one another in sliding registration engagement. For example, in one arrangement, there may be provided a groove on the top surface of member 13 and an extending or projecting portion on the bottom side of member 12. The extending portion from first member 12 would fit into the groove of a second member 13, enabling the members to be connected to one another in fixed registration.

The upper end of a platform member of apparatus 8 is connected either to fuel dispenser 10 or the lower end of another member, depending upon the placement or location of the member in the stacked configuration (if employed). If using only one member 12, the upper end of member 12 will connect to fuel dispenser 10 and the lower end of member 12 will be connected to the ground or a service station island using fasteners or other suitable connecting means 14. The platform members 12 can be used to elevate the fuel dispenser 10 from the ground, service station island and any other type of surface where the fuel dispenser is placed. Accordingly, although FIG. 1 illustrates fuel dispenser 10 disposed above island 6, this depiction is for illustrative purposes only and should not be considered in limitation of the invention. Rather, it should be understood that apparatus 8 may be employed to raise fuel dispenser 10 relative to island 6, a ground surface, or any other surface upon which fuel dispenser 10 is located.

In one alternate form, fuel dispenser 10 could also rest flush on the upper side of uppermost member 12 without the use of fastening devices or openings for a fastening means. Additionally, once member 12 has been connected to fuel dispenser 10 or is placed flush onto the upper end of an immediately lower member, the fuel dispenser and platform member combination will be placed on either the ground, a service station island, or any surface that is used to support the fuel dispenser.

In another form, the invention may be embodied or practiced as a kit for use in increasing the height of a fuel dispenser. The kit includes at least two members 12 and 13. In the kit, the members can be all one height, all different heights or a combination of heights. The kit, for example, could include four 1" members, three 2" members, one 3" member and two 4" members. Any number of combinations of members can be used with the kit.

The kit also includes connecting means 14 for connecting each of the members to one another as well as connecting one member to fuel dispenser 10. Connecting means 14 are typically fasteners, but other types of connecting means 14 can be used. For example, some of the fasteners that can be used include, without limitation, rivets, bolts, screws and flanges. Other types of fasteners can be used as well.

According to another form of the invention, the invention can be practiced as a method or procedure for increasing or variably adjusting the height of a fuel dispenser. According to the procedure, a platform or support member is connected to fuel dispenser at the underside thereof. The support member is connected to the fuel dispenser using a fastener or other suitable connecting means.

For example, the fuel dispenser could have openings in the housing of the fuel dispenser through which alignment and registration dowels extending from the support member may be insertably fitted. In particular, exemplary support member 12 (FIG. 1) could have a flange that would align with the openings on the housing of the fuel dispenser. Once the desired height is established by lowering the fuel dispenser onto the support member, a fastener would be inserted and secured into the openings for a secure fit between the support member and the fuel dispenser, thereby fixing the arrangement of the fuel dispenser relative to the support member. The support member could also have a groove on one end of the member wherein the groove is slightly larger than the size of the base of the fuel dispenser. The fuel dispenser would then fit firmly into the groove of the member.

The support member could also have a groove on both ends of the member wherein the upper end groove would be a particular depth such as two inches and the groove on the lower end would have a depth of four inches, for example. The fuel dispenser could then rest within the two-inch groove in the upper end of the support member. Alternately, the support member could be inverted so that the fuel dispenser is able to rest in the four-inch groove in the lower end of the member. The two and four-inch grooves are used for example purposes only and are not limiting to the invention.

Referring to apparatus 8 of FIG. 1, it is seen that the entire fuel dispenser infrastructure 10 is elevated or raised by the use of exemplary members 12 and 13. In this manner, every feature or functional aspect of fuel dispenser 10 (such as display or payment terminal 4) has its vertical height increased by the same amount corresponding to the vertical dimension of apparatus 8.

Figure 2:
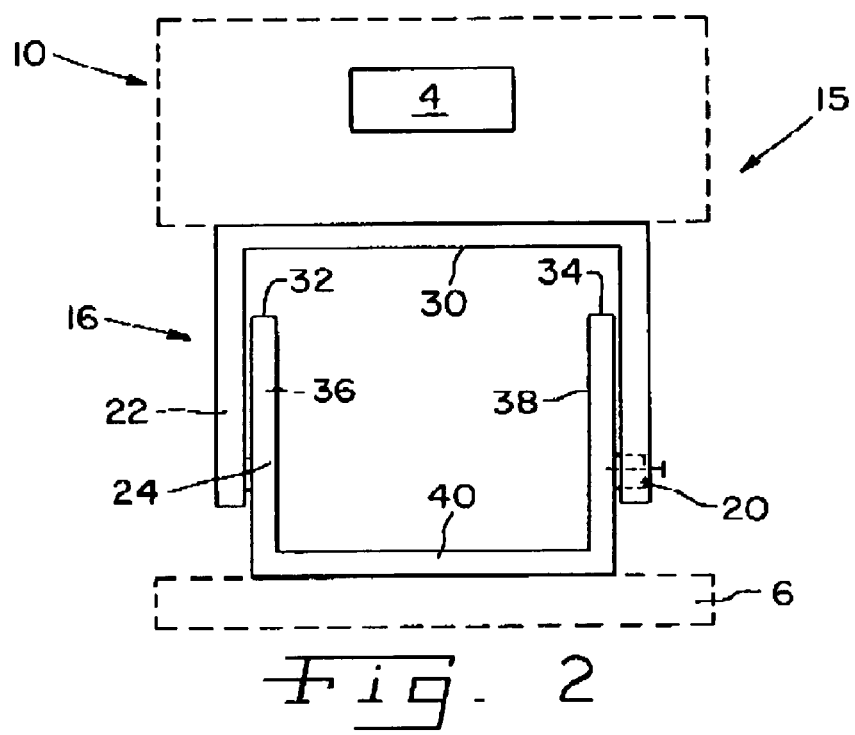
FIG. 2 is a diagrammatic side view of an apparatus to increase the vertical rise of a fuel dispenser, according to another form of the invention.

Referring now to FIG. 2, there is shown an adjustable apparatus 15 for use in variably adjusting the vertical rise of a fuel dispenser, namely, to increase the height of fuel dispenser 10 disposed thereon, according to another form of the invention.

The illustrated apparatus 15 includes an adjustable assembly 16 having a first member 22 and a second member 24. An adjustment means 20 is provided for adjusting the position of first member 22 relative to second member 24, namely, the vertical relationship between first member 22 and second member 24. The consequent effect of this adjustment is to adjust the overall height of assembly 16 and thereby raise or elevate fuel dispenser 10, which is mounted on and supported by assembly 16 at first member 22.

In alternate forms, it may be considered that first member 22 and second member 24 respectively define first and second sides or upper and lower ends of assembly 16. In one form, first member 22 is telescopingly connected to second member 24. Additionally, it may be considered that first member 22 and second member 24 are configured in vertically slidable relationship with one another. Adjustment means 20 can be connected to either first member 22 or second member 24. Adjustment means 20 can also be connected to both first member 22 and second member 24.

The telescoping or slidable connection allows one side of adjustable assembly 16 to move up and down while the other side of assembly 16 remains stationary. For example, if adjustment means 20 is connected to first member 22, first member 22 is moved upward to the desired height and then adjustment means 20 is locked into place so that assembly 16 is secured and can then be connected to fuel dispenser 10.

Adjustment means 20 can be connected to adjustable assembly 16 in many different ways. For example, one arrangement involves configuring at least one of the sides of assembly 16 (i.e., member 22 or 24) with a groove along its entire length. A portion of adjustment means 20 would extend into the grooved formation of assembly 16 to create a slidable connection between assembly 16 and adjustment means 20. When the desired height is established for assembly 16, a tightening lever connected to adjustment means 20 is moved in a clockwise motion to create a secure fit between assembly 16 and adjustable means 20. If a different height for assembly 16 is desired, the tightening lever is moved in the counterclockwise direction to release the tightened connection between assembly 16 and adjustment means 20. Adjustment means 20 is moved along the groove of the side of assembly 16 and once the new desired height is determined, the tightening lever on adjustment means 20 is moved in the clockwise direction.

Another way of connecting adjustment means 20 to assembly 16 is to employ a groove having openings along the length of the side of at least one of the sides of assembly 16 (i.e., member 22 or 24). A portion of adjustment means 20 extends into the groove of the side of assembly 16 so that a sliding connection is made between adjustment means 20 and assembly 16. A lever on adjustment means 20 has a spring pushing a portion of the lever towards and into the openings in the groove of assembly 16 to lock and prevent assembly 16 from moving. To move adjustment means 20 along the length of the side of assembly 16, the lever on adjustment means 20 is pulled in the direction opposite the openings in the grooves of assembly 16 so that the lever is no longer in the opening and assembly 16 can therefore be adjusted. Once a new desired height for assembly 16 is established, the lever on adjustment means 20 is released and the spring pushes a portion of the lever into the opening in the groove of assembly 16.

In another example of a connection between adjustable assembly 16 and adjustment means 20, adjustment means 20 is a fastener such as a bolt, rivet, screw or flange. Other types of fasteners can be used as well. Adjustable assembly 16 would have openings along the length of both first side 22 and second side 24. If first side 22 is the telescoping portion of adjustable assembly 16, first side 22 would be moved upward until a desired height is reached, wherein an alignment of the openings of first side 22 and second side 24 is established. If the openings are in alignment, adjustment means 20 is placed into the openings so that first side 22 cannot be moved in either the upward or downward direction without removing adjustment means 20. The height can be adjusted again by simply removing adjustment means 20. Once the desired height is established and there is an alignment of the openings between first side 22 and second side 24, adjustment means 20 is inserted into the openings to secure adjustable assembly 16. Fuel dispenser 10 would then be placed on adjustable assembly 16.

Referring to apparatus 15 of FIG. 2, it is seen that the entire fuel dispenser infrastructure 10 is elevated or raised by the use of assembly 16, namely, the arrangement of support members 22 and 24 in vertically slidable engagement with one another. In this manner, every feature or functional aspect of fuel dispenser 10 (such as display or payment terminal 4) has its vertical height increased by the same amount corresponding to the vertical extent of apparatus 15.

Support members 22 and 24 can be used to elevate fuel dispenser 10 from the ground, service station island and any other type of surface where the fuel dispenser is placed. Accordingly, although FIG. 2 illustrates fuel dispenser 10 disposed above island 6, this depiction is for illustrative purposes only and should not be considered in limitation of the invention. Rather, it should be understood that apparatus 15 may be employed to raise fuel dispenser 10 relative to island 6, a ground surface, or any other surface upon which fuel dispenser 10 is located.

As further shown in FIG. 2, lower support member 24 is disposed on island 6. FIG. 2 also depicts assembly 16 in an extended configuration where upper member 22 has been raised from its fully retracted position relative to lower member 24. In particular, in a fully retracted arrangement (i.e., no extension of upper member 22), the underside surface 30 of upper member 22 rests and is otherwise seated upon the upper free ends 32 and 34 of arms 36 and 38, respectively, of lower member 24. Even in this fully retracted position, assembly 16 still defines a vertical distance that elevates fuel dispenser 10 relative to its conventional position directly mounted to island 6. Further variable adjustments to the height of dispenser 10 are made by raising upper member 22 relative to lower member 24, as explained above.

As shown, in one form, upper member 22 and lower member 24 have a generally U-shaped configuration. For example, lower member 24 has generally parallel arms 36 and 38 extending at respective ends thereof from a connecting portion 40 disposed generally orthogonally to arms 36 and 38 to define a general U-shaped formation or structure.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for increasing the height of a fuel dispenser having a normal resting surface on a service station island, said fuel dispenser having an upright position with an underside, said fuel dispenser having a refueling nozzle and hose assembly and at least one of a display, a touch-type user interface, and a payment module, said apparatus comprising:
at least one member adapted to be disposed at the underside of the fuel dispenser to support and to adjust a rise of said fuel dispenser relative to the normal resting surface in a direction generally orthogonal to the fuel dispenser underside; and
a first connecting means being adapted for connecting one of said at least one member to the fuel dispenser at the underside thereof.

2. The apparatus according to claim 1, further includes a second connecting means, wherein said at least one member further includes a first member and a second member, wherein the second connecting means being adapted for connecting said second member to said first member.

3. The apparatus according to claim 1, wherein said first connecting means includes a fastener.

4. The apparatus according to claim 2, wherein said second connecting means includes a fastener.

5. The apparatus as recited in claim 1, wherein said fuel dispenser having at least one interior space, said at least one member being configured to be isolated from the at least one interior space of said fuel dispenser as operatively disposed relative to said fuel dispenser.

6. The apparatus as recited in claim 1, wherein said at least one member being disposed fully above the normal resting surface of said fuel dispenser.

7. The apparatus as recited in claim 1, wherein said at least one member being disposed fully above ground.

8. The apparatus as recited in claim 1, wherein said at least one member being configured to enable repeatable selective adjustment of the rise of said fuel dispenser following operative installation thereof.

9. A kit for increasing the height of a fuel dispenser having a normal resting surface on a service station island, said fuel dispenser having an upright position with an underside, said fuel dispenser having a refueling nozzle and hose assembly and at least one of a display, a touch-type user interface, and a payment module, said kit comprising:
at least two members adapted to be disposed at the underside of said fuel dispenser in support relationship to said fuel dispenser to facilitate adjustment of a rise of said fuel dispenser relative to the normal resting surface in a direction generally orthogonal to the fuel dispenser underside; and
a connecting means adapted for connecting each of said at least two members to adjacent ones of said members and connecting one of said at least two members to the fuel dispenser at the underside thereof.

10. The kit according to claim 9, wherein said connecting means includes a fastener.

11. The kit according to claim 9, wherein each of said at least two members having a different height.

12. A method of increasing the height of a fuel dispenser having a normal resting surface on a service station island, said fuel dispenser having an upright position with an underside, said fuel dispenser having a refueling nozzle and hose assembly and at least one of a display, a touch-type user interface, and a payment module, comprising the steps of:
providing at least one member adapted to be disposed at the underside of the fuel dispenser to support and to adjust a rise of said fuel dispenser relative to the normal resting surface in a direction generally orthogonal to the fuel dispenser underside; and
connecting the at least one member to the fuel dispenser at the underside thereof.

13. An adjustable apparatus for increasing the height of a fuel dispenser having a normal resting surface on a service station island, said fuel dispenser having an upright position with an underside, said fuel dispenser having a refueling nozzle and hose assembly and at least one of a display, a touch-type user interface, and a payment module, said apparatus comprising:
a vertically adjustable assembly adapted to be disposed at the underside of the fuel dispenser and operably coupled to the fuel dispenser underside to support and to adjust a rise of said fuel dispenser relative to the normal resting surface in a direction generally orthogonal to the fuel dispenser underside; and
an adjustment means for adjusting the vertical dimension of said adjustable assembly.

14. The adjustable apparatus according to claim 13, wherein said adjustable assembly further includes a first side member and a second side member, said first side member adjustably telescopingly connected to said second side member.

15. The adjustable apparatus according to claim 13, wherein said adjustment means includes a fastener.

16. An assembly for use with a fuel dispenser having a normal resting surface on a service station island, said fuel dispenser having an upright position with an underside, said fuel dispenser having a refueling nozzle and hose assembly and at least one of a display, a touch-type user interface, and a payment module, said assembly comprising:
at least one support member adapted to be disposed at least in part at the underside of the fuel dispenser and operably coupled to the fuel dispenser underside to support and to adjust a rise of said fuel dispenser relative to the normal resting surface in a direction generally orthogonal to the fuel dispenser underside.

17. The assembly as recited in claim 16, wherein the at least one support member further includes:
a plurality of support members in stacking arrangement.

18. The assembly as recited in claim 16, wherein each support member having a selective vertical dimension.

19. The assembly as recited in claim 16, wherein at least two support members having the same or different vertical dimension.

20. The assembly as recited in claim 16, wherein each support member removably attached to each support member adjacent thereto.

21. The assembly as recited in claim 16, wherein said at least one support member further includes a first member and a second member configured in adjustable vertically slidable relationship to one another.

22. A system, comprising:
a fuel dispenser having a normal resting surface on a service station island, said fuel dispenser having an upright position with an underside, said fuel dispenser having a refueling nozzle and hose assembly and at least one of a display, a touch-type user interface, and a payment module; and
a rise adjusting device adapted to be disposed at least in part at the underside of the fuel dispenser in support relationship to the fuel dispenser at the underside thereof to adjust a rise of said fuel dispenser relative to the normal resting surface in a direction generally orthogonal to the fuel dispenser underside.

23. The system as recited in claim 22, wherein said rise adjusting device base further includes:
   at least two members in stacking formation.

24. The system as recited in claim 22, wherein each member removably attached to each member adjacent thereto.

25. The system as recited in claim 22, wherein said rise adjusting device further includes a first member and a second member configured in adjustable vertically slidable relationship to one another.

26. A method of changing the height of a fuel dispenser associated with a normal fuel dispenser having a normal resting surface on a service station island, said fuel dispenser having an upright position with an underside, said fuel dispenser having a refueling nozzle and hose assembly and at least one of a display, a touch-type user interface, and a payment module, comprising the steps of:
   providing a rise adjusting device adapted to be disposed at the fuel dispenser normal resting surface to support and to facilitate adjustment of a rise of said fuel dispenser relative to the normal fuel dispenser position in a direction generally orthogonal to the fuel dispenser underside; and
   disposing the fuel dispenser at the underside thereof on the rise adjusting device.

27. The method as recited in claim 26, wherein the fuel dispenser position surface being defined by a service station island.

28. The method as recited in claim 26, wherein the fuel dispenser position surface being defined by a roadway.

29. A system suitable for use with a fuel dispenser having a normal resting surface on a service station island, said fuel dispenser having an upright position with an underside, said fuel dispenser having a refueling nozzle and hose assembly and at least one of a display, a touch-type user interface, and a payment module, said system comprising:
   first means, adapted to be disposed at least in part at the underside of the fuel dispenser and operably coupled to the fuel dispenser underside in support thereof, for operably displacing the fuel dispenser in a vertical dimension generally orthogonal to the fuel dispenser underside adjust a rise of the fuel dispenser relative to the normal resting surface.

30. The system as recited in claim 29, wherein said first means further includes:
   a first member and a second member configured in adjustable vertically slidable engagement to one another.

31. The system as recited in claim 30, wherein each of said first member and said second member respectively having a generally U-shaped formation.

32. The system as recited in claim 31, wherein the respective U-shaped formation of each of said first member and said second member having a respective set of arms in slidable connection with one another.

33. The system as recited in claim 30, wherein the first member and the second member being configured in telescoping relationship to one another.

34. An assembly for use with a fuel dispenser having a normal resting surface on a service station island, said fuel dispenser having an upright position with an underside, said fuel dispenser having a refueling nozzle and hose assembly and at least one of a display, a touch-type user interface, and a payment module, said assembly comprising:
   a combination having a first member and a second member configured in adjustable vertically slidable relationship to one another, said combination being adapted to be disposed in support relationship to the fuel dispenser at the underside thereof to enable adjustment of a rise of said fuel dispenser relative to the normal resting surface in a direction generally orthogonal to the fuel dispenser underside;
   wherein the first member being operably coupled to the fuel dispenser at the underside thereof.

* * * * *